No. 706,890. Patented Aug. 12, 1902.
F. BRACKETT.
APPARATUS FOR MIXING AND KNEADING DOUGH.
(Application filed Apr. 30, 1902.)
(No Model.) 3 Sheets—Sheet 1.
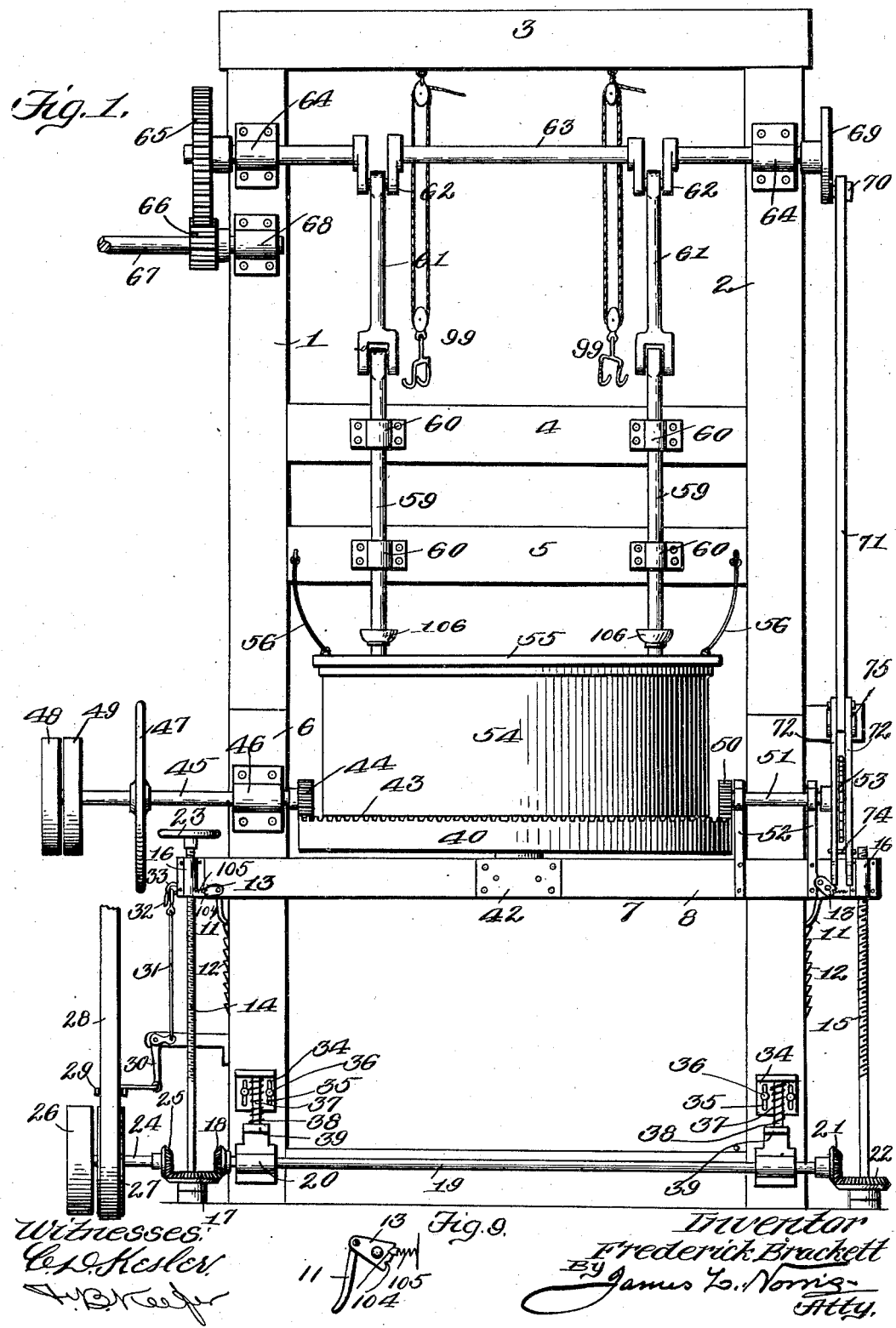

No. 706,890. Patented Aug. 12, 1902.
F. BRACKETT.
APPARATUS FOR MIXING AND KNEADING DOUGH.
(Application filed Apr. 30, 1902.)
(No Model.)  3 Sheets—Sheet 2.
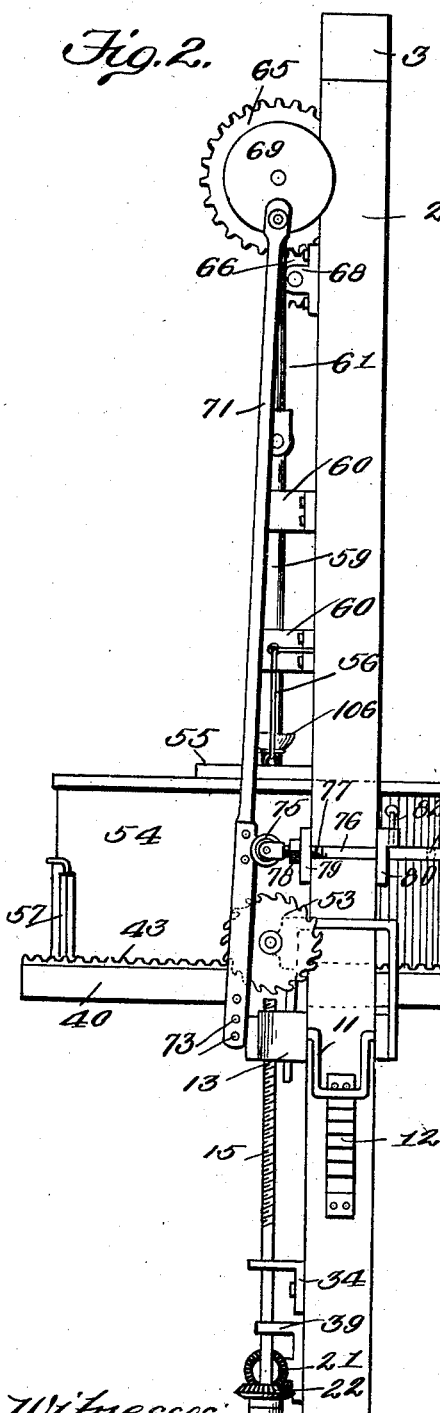
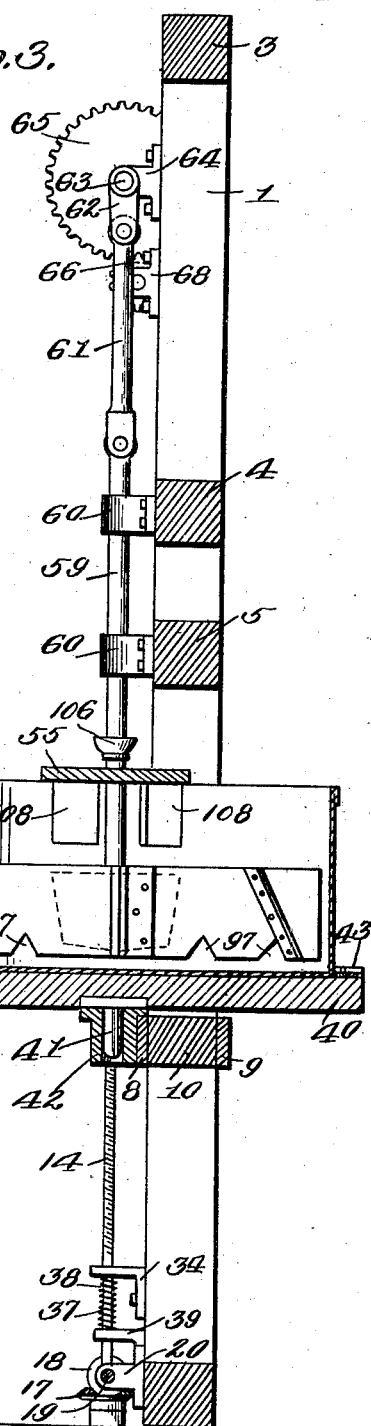
Witnesses  Inventor
Frederick Brackett
by James L. Norris
Atty.

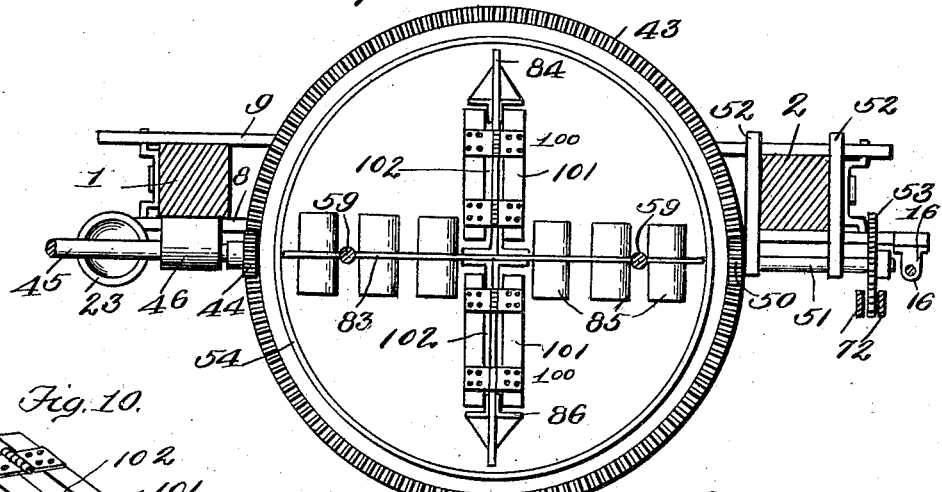

UNITED STATES PATENT OFFICE.

FREDERICK BRACKETT, OF BALTIMORE, MARYLAND.

APPARATUS FOR MIXING AND KNEADING DOUGH.

SPECIFICATION forming part of Letters Patent No. 706,890, dated August 12, 1902.

Application filed April 30, 1902. Serial No. 105,337. (No model.)

*To all whom it may concern:*

Be it known that I, FREDERICK BRACKETT, a citizen of the United States, residing at Baltimore city, in the State of Maryland, have invented new and useful Improvements in Apparatus for Mixing and Kneading Dough, of which the following is a specification.

My invention is designed for the production of an improved apparatus for mixing and kneading dough, the object of the same being to provide means whereby a rotary movement may be imparted to the kneading-pan for the preliminary mixing of the ingredients of the dough and means for imparting an intermittent rotary movement to said pan simultaneously with the operation of the reciprocating kneading mechanism therein.

A further object of the invention is to provide means for raising and lowering the kneading-pan and the table on which the same is mounted for the purpose of adjusting the position of said pan relative to the reciprocating kneading mechanism, according to the conditions under which the machine is operating and the quantity of dough in the pan.

A further object of the invention is to provide a novel construction of the pestles and arrangement of the same in groups and means for imparting a reciprocating movement thereto.

Other objects and advantages of the invention will hereinafter appear, and the novel features thereof will be set forth in the claims.

In the drawings forming part of this specification, Figure 1 is a front elevation of a mixing and kneading apparatus constructed in accordance with my invention. Fig. 2 is a side elevation or end view of the same. Fig. 3 is a vertical sectional view of the same. Fig. 4 is a sectional plan view. Fig. 5 is a perspective view of the kneading-frame with the pestles arranged in groups thereon. Fig. 6 is a detail front elevation of one of the arms of the kneading-frame. Fig. 7 is a detail sectional view on the line 7 7 of Fig. 6. Fig. 8 is a detail bottom plan view of two of the pestles. Fig. 9 is a detail view of one of the dogs for sustaining the pan-supporting frame in adjusted position, and Fig. 10 is a detail perspective view of one of the detachable combs for the kneading-frame.

Like reference-numerals indicate like parts in the different views.

The main frame of the machine may be of any suitable form and construction. It has been shown, however, as consisting of the uprights 1 2, a cross-beam 3, connecting said uprights at their upper ends, and cross-beams 4 and 5, connecting said uprights at points intermediate their ends. Surrounding the uprights 1 2 at their lower ends are the metallic casings or sheathings 6, which serve to strengthen said uprights and which act as wearing-surfaces, as will hereinafter appear.

Vertically adjustable on the main frame of the apparatus is a pan-supporting frame 7, the same comprising the parallel plates 8 9, arranged in horizontal position one on each side of the uprights 1 2. Said plates 8 and 9 are connected together so as to be maintained in parallel relation to each other and so as to produce a rigid structure by the filling-block 10, which is located between and is of substantially the same thickness as the uprights 1 and 2. The frame 7 is maintained and supported in any position to which it may be adjusted by the pivoted dogs 11, arranged at opposite ends of the same, which coöperate with the racks 12 on the uprights 1 and 2. These dogs are provided with handles 13 upon their projecting ends, by means of which the same may be turned for the purpose of releasing said dogs from the racks 12. The active portions of said dogs are normally maintained in engagement with the teeth of the racks 12 by gravity.

The pan-supporting frame 7 may be raised or lowered by means of the screw-shafts 14 15, which, as shown, are vertically disposed and mounted in suitable bearings at their lower ends. At their upper ends each of said shafts extends through a screw-threaded bearing-sleeve 16, so that when the same are turned in one direction or the other they will serve to raise or lower the frame 7. The said shafts 14 15 are intergeared with each other, so that when one is rotated the other will be simultaneously rotated. This gearing consists of a pinion 17 on the lower end of the shaft 14, which meshes with a pinion 18 on one end of a shaft 19, mounted in suitable bearings 20 in the uprights 1 and 2. The opposite end of the shaft 19 carries a pinion 21, which meshes with a pinion 22 on the shaft 15. It will thus be seen that if the shaft 14 be rotated the motion thereof through the connections described will be transmitted to the shaft 15. The shaft 14 may be turned by hand, for which purpose a hand-wheel 23 is connected with the upper projecting end thereof. Said shaft may also be rotated from the power-shaft 24, the latter being provided with a pinion 25, which meshes with the pinion 17 on the shaft 14. The power-shaft 24 is provided with a fast pulley 26 and with a loose pulley 27, around one or the other of which passes the power-transmitting belt 28. Connected with the belt 28 is a belt-shifter 29, which is operated by means of a bell-crank lever 30, having one arm thereon connected through the rod 31 with the end of the supporting-frame 7. The upper end of the rod 31 is provided with a hook 32, by means of which the same may be detachably connected to a loop or eye 33 on the frame 7.

The purpose of the construction just described is to provide for automatically arresting the upward movement of the frame 7 when the same has reached its limit—that is to say, when the belt 28 passes around the fast pulley 26 the power-shaft 24 will be rotated and the motion of the latter will be transmitted, through the means described, to the shafts 14 and 15, which will serve to elevate the frame 7. When, however, said frame reaches the limit of its upward movement, it will, through the connecting-rod 31, rock the bell-crank lever 30 and shift the belt 28 from the fast pulley 26 to the loose pulley 27. The power-shaft 24 then ceases to rotate and the upward movement of the frame 7 is instantly stopped.

Connected with the front sides of the uprights 1 and 2 are the vertically-movable yieldingly-supported brackets 34, the same serving as buffers for preventing damage to the operative parts in the event of a sudden drop of the heavy pan-supporting frame 7 and the parts carried thereby. These brackets are adapted to be engaged on their upper sides by the plate 8, forming part of the frame 7, and have been shown in the form of angle-irons having elongated vertically-disposed slots 35 therein, through which pass the pins 36, by means of which said brackets are connected with the uprights 1 and 2. These slots 35 provide for the vertical movement of said brackets or buffers; but the downward movement of said brackets is retarded and arrested by the springs 37. These springs have been shown in the form of coil-springs surrounding the studs or projections 38, which are secured to the fixed brackets 39 and extend upwardly therefrom. To provide for the passage of said studs through the horizontal portions of the brackets 34, the latter are formed with openings corresponding to the cross-sectional area of said studs.

Mounted upon the frame 7 is a rotary table 40, the same being provided on its under side and at its center with a depending journal or bearing-pin 41, which fits and moves within the socket of a bearing-plate 42, secured to the plate 8 of the frame 7. This construction provides for the central support of the table 40, with provision for the rotation of the same on the frame 7. The upper surface of the table 40 is provided with a circular rack 43, with which meshes, when the frame 7 is in its raised position, a pinion 44 on the power-shaft 45. The shaft 45 is mounted in bearings 46, secured to the upright 1, and is provided with a wheel 47, by means of which it may be turned. The same is also provided with fast and loose pulleys 48 and 49, respectively, around which a driving-belt is adapted to pass. Also meshing with the rack 43 is a pinion 50, carried by an intermittently-rotatable shaft 51, mounted in bearings in the brackets 52, secured to and extending upwardly from the frame 7 on opposite sides of the upright 2. The shaft 51 has secured to its outer end a ratchet-wheel 53, by means of which and the parts coöperating therewith an intermittent movement may be imparted to said shaft. Supported upon the table 40 and secured thereto by hooks or other suitable fastening devices is a kneading-pan 54, the same being circular in form and having its upper end partially closed by a cover 55. The said cover 55, as most clearly shown in Fig. 3 of the drawings, is narrower than the pan 54, so that passages are left on opposite sides thereof for the introduction of proper materials into said pan. The same is preferably supported by means of wires, chains, or other flexible connecting devices 56, which are attached at their upper ends to the cross-beam 5 of the main frame. A door 57 is provided in one side of the pan 54, by means of which the contents of said pan may be drawn off.

Mounted for vertical reciprocation in the pan 54 is a kneading-frame 58, the same being connected to the vertically-movable rods 59, leading upwardly therefrom and mounted in bearings 60 on the cross-beams 4 and 5 of the main frame. The upper ends of the rods 59 are connected through the pitmen 61 with the cranks 62 on the crank-shaft 63. The said shaft 63 is mounted in bearings 64 in the uprights 1 and 2 and has a gear 65 on one end, with which meshes the pinion 66 on a power-shaft 67, by means of which said crank-shaft may be rotated during the operation of said power-shaft. The said shaft 67 has been shown as mounted in bearings 68 in the upright 1. The end of the shaft 63 opposite the gear 65 thereon is provided with a disk 69, having a wrist-pin 70 thereon, to which is pivoted a pitman 71, having the parallel arms 72 secured to its lower end. The said arms 72 straddle the ratchet-wheel 53 and are provided with a series of transverse openings 73 therein, through each pair of which is adapted to be passed a removable pin 74. The position of the pin 74 may be adjusted by inserting the same into one or the other sets of openings 73 in the arms 72. The said pin is adapted to engage the teeth of the ratchet-wheel 53, so that when the pitman 71 is raised it will serve to rotate the shaft 51, to which the ratchet-wheel 53 is secured. As the pitman 71 is connected through the wrist-pin 70 with the disk 69 on the crank-shaft 63, said pin has imparted to it an intermittent up-and-down movement, and consequently, through the mechanism described, an intermittent rotary movement will be imparted to the shaft 51. During the upward movement of the pitman 71 the pin 74 is in engagement with one of the teeth on the ratchet-wheel 53, and therefore serves to rotate said wheel. Upon the downward movement of the pitman 71, however, the pin 74 rides over the inclined faces of the teeth of the ratchet-wheel 53, and consequently no movement is imparted to said wheel or to the parts connected therewith. To guide the arms 72 during their reciprocating movement, I provide a flanged guide-wheel 75, which is supported from the upright 2, as shown. This guide-wheel is capable of being moved outwardly away from the upright 2 and locked in such outward position for the purpose of disengaging the pin 74 from the ratchet-wheel 53. For this purpose said guide-wheel is mounted upon the outer end of a rectangular rod 76, extending through a correspondingly-shaped opening in the upright 2 and provided with a screw-threaded portion 77, on which is placed an adjusting-nut 78. The same also passes freely through the plates 79 and 80, secured to opposite sides of the upright 2. The rod 76 is provided with the opening 81, adapted to receive a vertically-movable locking-pin 82, carried by the plate 80. By this construction it will be seen that when it is desired to throw the pin 74 out of operative relation with the ratchet-wheel 53 it is merely necessary to force the rod 76 outwardly and introduce the locking-pin 82 into the opening 81. The reciprocation of the pitman 71 when the parts are in the positions just described will then have no effect upon the ratchet-wheel 53 and the shaft 51. To adjust the position of the guide-wheel 75, it is merely necessary to turn the nut 78 thereon in one direction or the other.

The kneading-frame 58 consists of the arms 83 and 84, secured to each other at the center and extending at right angles to each other, the pestles 85 on the arm 83, and the deflecting cutters 86 on the arm 84. The pestles 85 are arranged in groups on opposite sides of the arm 83 and on opposite sides of the arm 84. Twelve pestles have been shown in the group; but it is obvious that this number may be increased or decreased, if desired. Each of the pestles has a rounded top 87, an inclined bottom 88, inclined sides 89, which converge toward their lower ends, and inclined front faces 90, which converge toward their backs from their upper ends downwardly. The bottom 88 of each pestle converges toward the top from back to front. The result of this construction is that during the downward movement of the kneading-frame 58 an inclined face or wall of each pestle will be brought into contact with the dough under treatment, no matter at what point on the pestle contact with the dough takes place. As a further result of this construction a space or passage 91 is formed between each pair of pestles on each side of the arm 83, which space is tapering from its lower end upwardly and from its inner end outwardly. While it is preferred to make the top 87 of each pestle rounded or arch-shaped, I do not limit myself to this construction, as it may be flat or pyramidal in form. The pestles 85 are secured to the arm 83 of the kneading-frame by means of screw-bolts 92, two of said bolts being preferably employed, one above the other. These bolts extend through the arm 83 and through openings in the pestles 85 on opposite sides of said arm, and the pestles are locked in place thereto by means of nuts 93, which screw upon the ends of said bolts and fit within sockets 94 in said pestles. To produce a more rigid structure and to prevent any slipping of the pestles on the arm 83, I provide the inner surfaces of said pestles adjacent to the arm 83 with sockets 95, which receive nuts 96 at the central portions of the bolts 92 on opposite sides of the arm 83. In the lower edges of each of the arms 83 and 84 I form notches or slots 97 for the passage of the dough beneath said arms during the preliminary mixing when the ingredients of the dough are in a liquid or watery condition. The deflecting cutters 86 are triangular in shape, the same being secured on opposite sides of the arm 84, near the opposite ends of the latter. The same are provided with flanges 98, by means of which they may be bolted or otherwise secured to the arm 84, and are inclined in position, so that when the kneading-frame 58 is forced downwardly during the kneading operation these cutters will also serve to compress and squeeze the dough, forcing the same toward the center of the pan 54 and coöperating with the pestles 85 in the operation of kneading. The principal part of the kneading, however, is effected by the pestles 85. As the kneading-frame 58 is reciprocated by the rotation of the crank-shaft 63 the pestles will be moved back and forth down into and away from the dough in the pan 54. That portion of the dough which is engaged by the inclined bottom wall 88 of each pestle will be subjected to a squeezing and kneading action similar to that effected by the human hands in the act of kneading, the dough being forced outwardly from beneath said bottom 88. The compression of the dough without the squeezing or kneading action, which would be effected by a horizontal bottom wall on each pestle, is avoided. A similar action is effected by the sides 89 of the pestles 85 during the downward movement of the kneading-frame—that is to say, those portions of the dough which are engaged by the sides 89 within the spaces 91 between said sides have imparted to them a squeezing or kneading action by being forced into and through the spaces 91 between the inclined sides 89. The dough acted upon by these parts is forced outwardly and upwardly, the action thereon being similar to that effected by the human hands in the operation of kneading. When the kneading-frame 58 reaches the limit of its upward movement, the tops 87 thereof approach or come in contact with the lid or cover 55 and the latter serves to remove from the tops 87 or force back into the pan 54 any projecting portions of the dough which may be adhering to said tops.

The operation of my apparatus is as follows: With the pan-supporting frame 7 in its lowermost position the ingredients of the dough are placed in the pan 54, and afterward said frame 7, with the pan thereon, is elevated. This may be done by applying power to the screw-shaft 14 by the hand-wheel 23 or by the power-shaft 24. When the shaft 14 is turned, it will through the gearing described impart a corresponding movement to the shaft 15, and these two shafts, rotating in the internally-screw-threaded bearing-sleeves 16, serve to raise the frame 7. When the rack 43 on the table 40 reaches a point so that the pinion 44 on the shaft 45 meshes therewith, the upward movement of the frame 7 is arrested. This may be done automatically when the frame is raised by the action of the power-shaft 24 by the rocking of the bell-crank lever 30, which shifts the power-transmitting belt 28 from the fast pulley 26 to the loose pulley 27. At this time the pin 74 is thrown out of operative relation with the ratchet-wheel 53 by moving the guide-wheel 75 outwardly. Power is now applied to the shaft 45 with the result that through the pinion 44 and the rack 43 the table 40 and the kneading-pan 54 thereon are rapidly rotated. The ingredients of the dough in the pan 54 are in a liquid or watery condition and the kneading-frame 58 is in any desired position. The result of the rotation of the pan 54 is to thoroughly mix the ingredients of the dough in said pan by causing the same to strike against the different projecting parts of the kneading-frame 58. From time to time flour and, if necessary, other ingredients are introduced into the pan 54 through the spaces on opposite sides of the cover 55, the result being that said flour is thoroughly mixed with the other ingredients of the dough contained in the pan 54 and that said dough is increased in density. When the proper consistency of the dough has been reached for kneading, the shaft 45 is thrown out of operation either by shifting the power-transmitting belt thereof from the fast pulley 48 to the loose pulley 49 or by lowering the pan-supporting frame 7, so that the rack 43 moves out of mesh with the pinion 44. This may be done by reversing the operation of the screw-shafts 14 and 15 from that above described. According to the conditions under which the machine is operated and the quantity of dough in the pan 54 the frame 7 is lowered to a greater or less extent. Its position may be adjusted at any point by means of the dogs 11, which coöperate with the racks 12 on the sides of the uprights 1 and 2. When the proper position of the frame 7 or, rather, of the pan 54 thereon has been reached, the guide-wheel 75 is moved inwardly to the position shown in Fig. 2 of the drawings, so that the pin 74, carried by the arms 72, is in operative relation to the ratchet-wheel 53. According to the position of the frame 7 and the extent to which it is desired to rotate the shaft 51 at each stroke the pin 74 is adjusted in one or the other of the sets of openings 73 in the arms 72. The shaft 67 is now thrown into operation, with the result that the crank-shaft 63 is rotated and through the connections described imparts a reciprocating movement to the kneading-frame 58 and to the pitman 71, which has connected to it the arms 72. When the pitman 71 is thus reciprocated, an intermittent movement will be imparted to the shaft 51 through the pins 74 and the ratchet-wheel 53, and consequently an intermittent rotation will be imparted to the table 40 and the pan 54 carried thereby. This movement will be greater or less, and the speed of reciprocation of the kneading-frame 58 will be increased or decreased, according to the speed of rotation of the shaft 67. It will thus be seen that during the kneading operation an intermittent rotary movement is imparted to the pan 54, which contains the dough, and a reciprocating movement is imparted to the kneading-frame 58, which acts upon the dough in said pan. Every particle of said dough therefore will be acted upon by the pestles 85, forming part of the kneading-frame 58, which pestles, as heretofore stated, effect a squeezing or kneading action similar to that effected by the human hand during the operation of hand-kneading. The deflecting-cutters 86 assist the pestles 85 in this kneading operation by cutting up the dough with which they come in contact and forcing the same inwardly toward the center of the pan with a squeezing or pushing action as contradistinguished from a compressing or packing action. When the kneading operation has been continued for a sufficient length of time, the shaft 67 is thrown out of operation, the frame 7 is lowered, and the contents of the pan 54 are removed through the gate or door 57. During this lowering movement of the frame 7 and the parts carried thereby danger of breakage is prevented by the provision of the buffers 34, heretofore referred to, which project out within the path of movement of the plate 8 of the frame 7.

Of course instead of removing the contents of the pan through the gate or door 57 said pan may be bodily removed from the table 40 and placed in a "raising-room," thus obviating the necessity of emptying the dough from the pan until it is ready for molding into loaves. The said pan may of course be readily removed from the table 40 by merely loosening the hooks or other fastening devices by which it is secured thereto.

To raise and lower the kneading-frame 58 independently of the crank-shaft 63 and to support the same in any position to which it may be moved, I connect each of the rods 59 with the cross-beam 3 by means of a block and tackle 99. Each of the same is connected with one of the rods 59 at a point below the pitman 61 and is adapted to be operated in the usual and well-known manner.

For facilitating the preliminary mixing of the liquid ingredients of the dough when the pan 54 is rotated by the shaft 45 I employ two movable combs 100, the same embracing the arm 84 on the kneading-frame 58 on opposite sides of the center. Each of these combs is made up of two back pieces 101, hinged to each other, with an intervening space 102 provided for the reception of the arm 84 and having teeth 103 projecting downwardly therefrom, but terminating a short distance from the bottom of the pan 54.

The handles 13 of the dogs 11 extend at right angles to the pivots on which said dogs are mounted, and each of the same is provided with a plurality of notches or indentations 104, adapted to be engaged by a spiral spring 105 for holding the dog in or out of operative relation to the rack 12.

Oil-cups 106 may be provided on the rods 59 beneath the bearings 60, through which said rods 59 work for preventing the oil from said bearings from dropping into the pan 54. The pan 54 and the arms 83 and 84 on the kneading-frame 58 are preferably constructed of iron or steel and are galvanized to prevent rusting. The pestles 85 may be made of wood, metal, or other suitable substance, and wood or other like covers 107 are provided for the ends of the bolts 92 and the nuts 93 thereon, these covers being designed for the purpose of preventing any possible rust at the points where they are located.

The cover 55 of the pan 54 may, if desired, be provided with projections 108 on its under side designed to fit loosely in the spaces 91 between the pestles 85 for forcing the dough back into the pan when the kneading-frame 58 is elevated.

Having now described my invention, what I claim as new, and desire to secure by Letters Patent, is—

1. In an apparatus for mixing and kneading dough, a vertically-adjustable pan-supporting frame, a rotary table carried thereby having a circular rack thereon, a kneading-pan on said table, kneading mechanism coöperating with said pan, a shaft mounted in bearings in said frame, a pinion on said shaft meshing with said rack, operating means for said kneading mechanism, and adjustable connections between said operating means and said shaft for intermittently rotating said table and the pan carried thereby.

2. In an apparatus for mixing and kneading dough, a vertically-adjustable pan-supporting frame, a rotary table carried thereby and having a circular rack thereon, a kneading-pan mounted on said table, reciprocating kneading mechanism operating in said pan, a pinion carried by said frame meshing with said rack, a rotary shaft having cranks thereon connected with said kneading mechanism for operating it, and adjustable connections between said shaft and said pinion for intermittently rotating the latter in any position of said frame.

3. In an apparatus for mixing and kneading dough, a vertically-adjustable pan-supporting frame, a rotary table carried thereby having a circular rack thereon, a kneading-pan mounted upon said table, reciprocating kneading mechanism operating in said pan, a pinion carried by said frame meshing with said rack, a ratchet-wheel connected with said pinion, a rotary shaft having cranks thereon connected with said kneading mechanism, a pitman eccentrically connected with said shaft and an adjustable engaging portion thereon coöperating with the teeth of said ratchet-wheel, as and for the purpose set forth.

4. In an apparatus for mixing and kneading dough, a rotary table having a circular rack thereon, a kneading-pan mounted on said table, reciprocating kneading mechanism operating in said pan, a pinion meshing with said rack, a ratchet-wheel connected with said pinion, a rotary shaft having cranks thereon connected with said kneading mechanism, a disk having a wrist-pin thereon secured to said shaft, a pitman pivoted to said wrist-pin, parallel arms secured to said pitman and embracing said ratchet-wheel, and an adjustable pin connecting said arms and adapted to engage the teeth of said ratchet-wheel, as and for the purpose set forth.

5. In an apparatus for mixing and kneading dough, a vertically-adjustable pan-supporting frame, a table mounted for rotation thereon, a kneading-pan carried by said table, vertically-reciprocating kneading mechanism operating in said pan, and means for intermittently rotating said table, the said means having an adjustable connection with said table whereby the same may operate to rotate said table in any position to which said table may be adjusted.

6. In an apparatus for mixing and kneading dough, a vertically-adjustable pan-supporting frame, a rotary table supported thereby having a circular rack thereon, a kneading-pan mounted upon said table, reciprocating kneading mechanism operating in said pan, a shaft mounted in bearings on said pan-supporting frame having a pinion thereon meshing with said rack and having a ratchet-wheel thereon, a crank-shaft operatively connected with said kneading mechanism, a pitman eccentrically connected with said crank-shaft, and an adjustable engaging portion carried by said pitman and coöperating with said ratchet-wheel, as and for the purpose set forth.

7. In an apparatus for mixing and kneading dough, a vertically-adjustable pan-supporting frame, a rotary table thereon provided with a circular rack, a kneading-pan mounted upon said table, a drive-shaft mounted in fixed bearings and having a pinion thereon meshing with said rack, when said frame is in its raised position, for imparting a continuous rotation to said table, an intermittently-rotatable shaft mounted in bearings on said pan-supporting frame having a pinion thereon meshing with said rack and having a ratchet-wheel thereon, reciprocating kneading mechanism operating within said pan, a crank-shaft operatively connected with said kneading mechanism, and an adjustable pin reciprocated by said crank-shaft and coöperating with said ratchet-wheel for imparting an intermittent movement thereto and to the parts connected therewith.

8. In an apparatus for mixing and kneading dough, the combination with two uprights of the main frame, having racks thereon, of a vertically-movable pan-supporting frame, means for raising and lowering said pan-supporting frame, and pivoted dogs carried thereby and coöperating with said racks for supporting said pan-supporting frame in adjusted position, the said dogs being normally held by gravity in operative relation to said racks.

9. In an apparatus for mixing and kneading dough, a vertically-movable pan-supporting frame and means for raising and lowering said frame, the said means consisting of vertically-disposed intergeared screw-shafts, internally-screw-threaded bearings in said frame through which said shafts pass, and means for rotating said shafts.

10. In an apparatus for mixing and kneading dough, a vertically-movable pan-supporting frame, means for raising and lowering said frame, and means for automatically arresting the upward movement of said frame when the same has reached a predetermined point.

11. In an apparatus for mixing and kneading dough, a vertically-movable pan-supporting frame, a rotary shaft having a fast pulley and a loose pulley thereon, operative connections between said shaft and said frame for raising and lowering the latter, a driving-belt, a belt-shifter therefor and connections between said belt-shifter and said frame for operating the former to shift said belt from the fast pulley to the loose pulley, when said frame reaches a predetermined point in its upward movement.

12. In an apparatus for mixing and kneading dough, a vertically-movable pan-supporting frame, a rotary shaft having a fast pulley and a loose pulley thereon, operative connections between said shaft and said frame for raising and lowering the latter, a driving-belt, a belt-shifter therefor, a bell-crank lever connected with said belt-shifter for operating it, and a rod connecting said bell-crank lever with said frame, whereby said belt will be shifted from said fast pulley to said loose pulley when said frame reaches a predetermined point in its upward movement.

13. In an apparatus for mixing and kneading dough, a vertically-movable pan-supporting frame, vertically-movable brackets, constituting buffers, within the path of downward movement of said frame, and springs for supporting said brackets.

14. In an apparatus for mixing and kneading dough, the combination with a kneading-pan, of a reciprocating kneading-frame comprising a plurality of arms set at an angle to each other and pestles arranged in groups on one of said arms.

15. In an apparatus for mixing and kneading dough, a kneading-pan and a reciprocating kneading-frame comprising a plurality of arms set at right angles to each other, a group of pestles secured to one of said arms, and deflecting-cutters carried by the other of said arms.

16. In an apparatus for mixing and kneading dough, a kneading-pan and a reciprocating kneading-frame operating within said pan, the same comprising a plurality of arms arranged at right angles to each other, each of said arms having notches or slots in its lower edge, a group of pestles secured to one of said arms, and deflecting-cutters carried by the other of said arms.

17. In an apparatus for mixing and kneading dough, a reciprocating kneading-frame comprising an arm and kneading-pestles arranged in groups on opposite sides of said arm, each of said pestles having upwardly-inclined bottom walls.

18. In an apparatus for mixing and kneading dough, a reciprocating kneading-frame comprising an arm and kneading-pestles arranged in groups on opposite sides of said arm, each of said pestles having the sides thereof converging from its upper end downwardly.

19. In an apparatus for mixing and kneading dough, a reciprocating kneading-frame comprising an arm and kneading-pestles arranged in groups on opposite sides of said arm, each of said pestles having the front wall thereof converging toward the back from the upper end thereof downwardly.

20. In an apparatus for mixing and kneading dough, a group of separated kneading-pestles connected to a common support, each having an upwardly-inclined bottom wall and sides which converge toward each other from the upper end downwardly.

21. In an apparatus for mixing and kneading dough, a kneading-pestle having an upwardly-inclined bottom wall, side walls which converge from the upper end thereof downwardly and a front wall which converges toward the back from the upper end downwardly.

22. In an apparatus for mixing and kneading dough, a kneading-pestle having an upwardly-inclined bottom, a curved or arched top, sides which converge from the upper end downwardly, and a front which converges toward the back from the upper end downwardly.

23. In an apparatus for mixing and kneading dough, a reciprocating kneading-frame comprising an arm and a group of kneading-pestles arranged in pairs on opposite sides of said arm, the pestles on each side of said arm being separated from each other by spaces which converge from the bottom upwardly.

24. In an apparatus for mixing and kneading dough, a group of kneading-pestles having spaces between them which converge from the bottom upwardly and from the inner end outwardly.

25. In an apparatus for mixing and kneading dough, a group of kneading-pestles having upwardly-inclined bottom walls and having spaces between them which converge from the lower end upwardly.

26. In an apparatus for mixing and kneading dough, a group of kneading-pestles having upwardly-inclined bottom walls and having spaces between them which converge from the lower end upwardly and from the inner end outwardly.

27. In an apparatus for mixing and kneading dough, a reciprocating kneading-frame comprising an arm and pestles secured to said arm on opposite sides thereof, the bottom walls of said pestles being upwardly inclined from the points of connection with said arm, and the spaces between those pestles which are arranged on the same side of said arm converging from their lower ends upwardly.

28. In an apparatus for mixing and kneading dough, a reciprocating kneading-frame comprising an arm, pestles secured to said arm on opposite sides thereof, the bottom of each of said pestles being upwardly inclined from its point of connection with said arm, and the spaces between the pestles on the same side of said arm being tapering from their lower ends upwardly and from said arm outwardly.

29. In an apparatus for mixing and kneading dough, a reciprocating kneading-frame comprising an arm, pestles arranged in pairs on opposite sides of said arm and screw-bolts for securing said pestles to said arm, the said bolts extending through said arm and through openings in the pestles on opposite sides thereof, nuts for locking said bolts to said arm located on opposite sides thereof and fitting within sockets in the inner faces of said pestles, and nuts for securing said pestles to said bolts, the latter nuts screwing upon the ends of said bolts and fitting within sockets in the outer surfaces of said pestles.

In testimony whereof I have hereunto set my hand in presence of two subscribing witnesses.

FREDERICK BRACKETT.

Witnesses:
 THOS. S. WATERS, Jr.,
 MINA A. BRACKETT.